United States Patent Office 3,485,935
Patented Dec. 23, 1969

3,485,935
HIGH VOLTAGE CABLE JOINT
Frederik Hendrik Kreuger, Delft, Netherlands, assignor to N.V. Nederlandsche Kabelfabrieken, Delft, Netherlands
Filed Oct. 25, 1966, Ser. No. 589,370
Claims priority, application Netherlands, Nov. 4, 1965, 6514324
Int. Cl. H02g *15/08*
U.S. Cl. 174—88      4 Claims

ABSTRACT OF THE DISCLOSURE

A high voltage cable joint having a preformed cylindrical insulating housing bush sealed at both ends to the cables which are connected thereby. The cable joint includes an electrically conductive shield concentric with the bush and enclosing both connected bare cable conductor ends and having, in use, the same potential as the cable conductor ends.

---

The present invention relates to a cable joint, and more particularly to a high voltage cable joint for electrically and mechanically connecting two single conductor cables or two cables with two or more conductors.

In the present invention the cable joint is formed by stripping the protecting and insulating material at the respective ends of the conductors to be joined, axially connecting the conductive cores to each other by means of a connector, and insulating the bare core ends and the connector with regard to the surroundings.

While such high voltage cable joints are commonly known, in known cable joints it is necessary to cut the insulation of both conductive cores to be interconnected by the connector obliquely, wind the tapered insulation so provided up by hand with tape or band shaped insulation material, provide this insulated connection with another layer of band shaped insulation material, and provide layers for controlling the field distribution. The connection so provided, must then be housed in a completely closed box or container which is tightened about the cables or conductors, and filled and cast with cable compound or other solid or fluid insulation material.

It is evident that the construction of these cable joints of the prior art requires skilled personnel and is a very time consuming task. This is especially true, since the conical removal of the core insulation and the winding up of the tapered insulation must be done with extreme care. Besides, the time needed for carefully removing the insulation and winding, time is also expended with such cable joints of the prior art in the filling of the box with oil and solidifying the cable compound.

It is an object of the present invention to provide a cable joint, which can be made swiftly, with the time normally expended solidifying cable compound eliminated.

It is another object of the present invention to provide a cable joint wherein the conical removal of core insulation and the winding up of the insulation are eliminated.

It is another object of the present invention to provide a normal joint for high tension cables which may be made and installed by non-skilled workmen.

It is another object of the present invention to provide a cable joint of the type specified above, in which the axial cores of the cables are joined together by means of a connector, wherein a cylindrical insulating bush is placed over the insulation material of both connected cores, around the bare core ends and the connector, and is tightened to the core insulation so as to prevent air inclusions between it and the outer surface of the cable; the exterior of this cylindrical insulating bush being covered with an electrical conductive layer connected at both ends to the conductive protecting layers of both the cables.

It is another object of the present invention to provide a cable joint of the type specified above wherein said cylindrical insulating bush includes a concentrical electrical conductive shielding cylinder, which is electrically connected to the cores.

It is another object of the present invention to provide a cable joint having a cylindrical insulating bush as described above which is preformed at the factory and not made, as is the case with cable joints of the prior art, by winding insulating tape on the spot, thereby greatly improving the reliability of the cable joint formed.

It is another object of the present invention to provide a high voltage joint as described above, wherein the space within the shielding cylinder is field free, with the cylinder having the same potential as the cores.

It is another object of the present invention to provide a cable joint in which the core insulation can be cut-off along a line substantially perpendicular to the longitudinal axis of the cable, thereby further decreasing the mounting time.

Still a further object of the present invention is to provide a cable joint which is relatively small in size.

The attainment of the above and further objects of the present invention will be apparent from the following specification taken in conjunction with the following drawings forming a part thereof.

Figure 1:
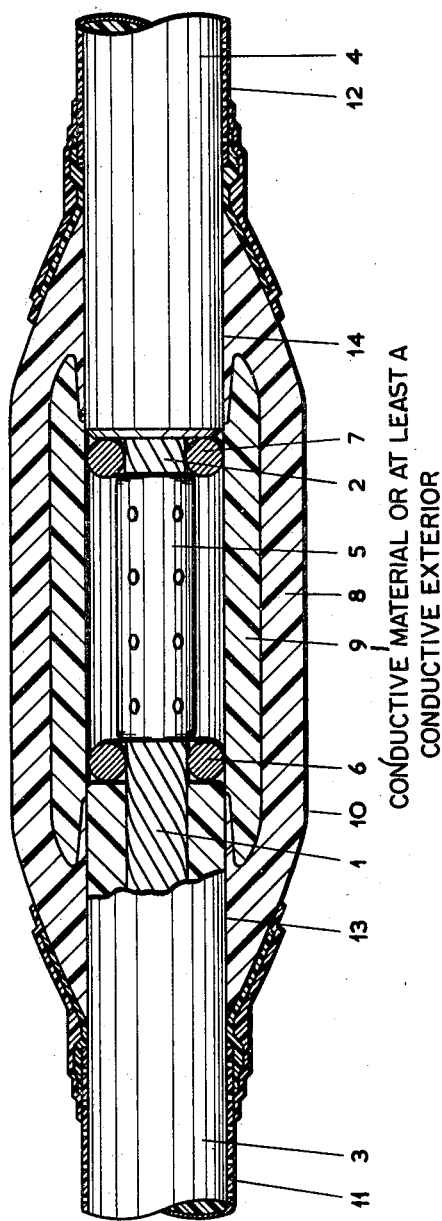
FIGURE 1 is a diagrammatic longitudinal view, partly in section, of a cable joint embodying the present invention.

As shown in FIGURE 1, two cores 1 and 2, provided with plastic insulation 3 and 4, respectively, have the insulation material stripped from their ends and are mechanically connected together by the connector 5. The connector 5 may be a low voltage connector even though embodied in a high voltage joint.

A cylindrical insulating bush 8 is provided over the insulation material 3 and 4 of the two connected cables, around the bare core ends 1 and 2, and the connector 5. The portion of the cylindrical housing bush 8 which is clamped about the cable insulation 3 and 4 at 13 and 14 is made of elastic material so that in the boundary layers 13 and 14 there are no air inclusions present. This is very important as it is known that such air inclusions may give rise to discharge phenomena, which are not desired.

The exterior of the cylindrical bush 8 is covered with a conductive coating 10, connected to both cable sheets 11 and 12. The cylindrical bush is also provided with an electrical conductive shielding cylinder, as shown in FIGURE 1, in the form of a cylindrical body 9 mounted in abutment with the inner wall of the cylindrical bush 8. The body 9 may be made entirely of electrically conductive material, or if prefered, merely its exterior may be electrically conductive.

Figure 2:
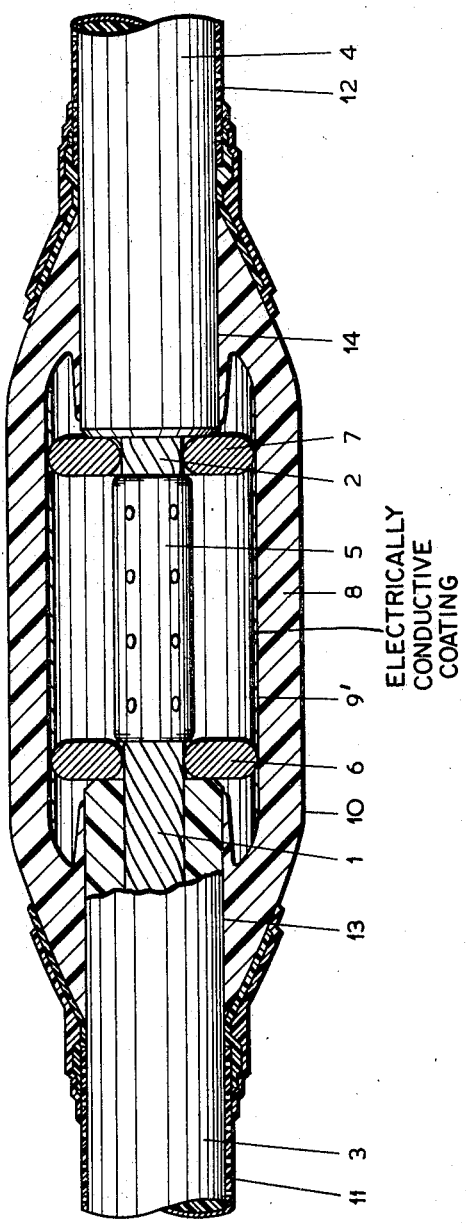
FIGURE 2 is a diagrammatic longitudinal view, partly in section, of another embodiment of the invention.

If desired, the body 9 may be completely eliminated and the cylidnrical bush 8 be provided with a concentrical groove 9' as shown in FIGURE 2 in which the wall layer has been made electrically conductive.

The space in the shielding cylinder, i.e. within the cylindrical body 9 is field free, since it is connected to the live cores 1 and 2 by means of spring packets 6 and 7. Electrical connection between the shielding cylinder and the cores, however, can also be made by any other means desired. As shown in the drawings, the cable insulation 3 and 4 in the joint is cut along a line substantially perpendicular to the longitudinal axis of the cable.

A high voltage cable joint in accordance with the present invention can be made very rapidly. A preformed cylindrical bush 8 with a shielding cylinder 9 or shielding concentrical groove 9' is first pressed upon one of the cable or connector ends to be connected. The insulation 3 and 4 is then cut-off the two cable or conductor ends and the two spring packets 6 and 7 and the low voltage connector 5 are positioned in place. The connector 5 may mechanically connect the core ends 1 and 2 by being soldered or indented into said cores. The cylindrical bush 8 is then moved into position and the conductive layer 10 surrounding the exterior of said cylindrical bush connected to the sheets 11 and 12 of said cable or conductor ends.

Since there are no conductor tips necessary, a joint in accordance with this invention is normally of a very small size, for example a 65 kv. line has a length of only 32 cm.

Figure 3:
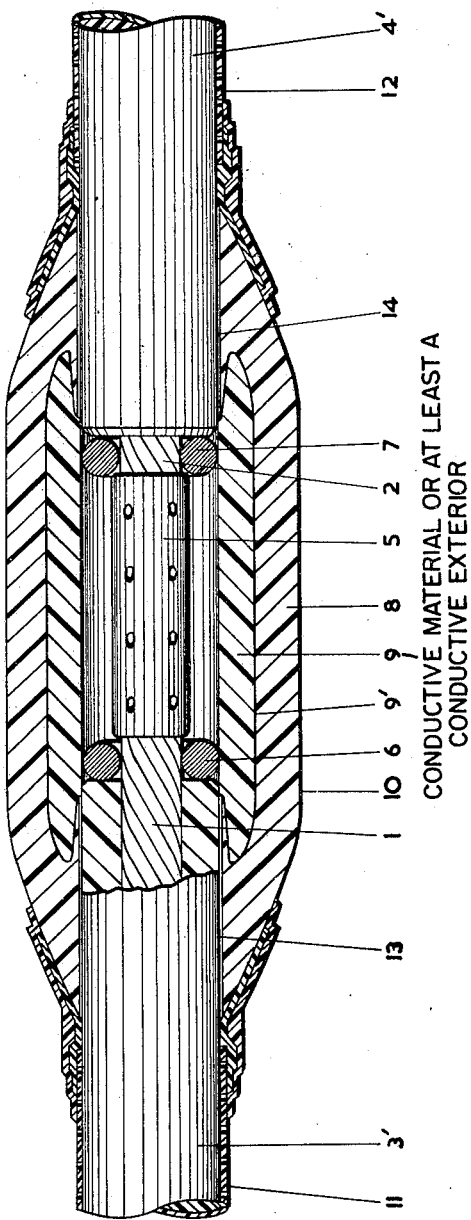
FIGURE 3 is a diagrammatic longitudinal view, partly in section, of another embodiment of the invention.

FIGURE 3, illustrates another embodiment of the invention as applied to paper insulated cables. When applying this invention to paper insulated cables it is preferable that there be provided a small interstice at 13, and 14, which is filled with oil or other insulating material. The interstices 13 and 14 serve to prevent damaging the paper insulation 3' and 4' when the cylindrical bush is moved over the cable. When joints in accordance with this invention are applied to paper insulated cables the cylindrical bush 8 is made of a substantially rigid material.

While I have shown the preferred embodiments and means of practicing the present invention, it is understood that various changes may be made by those skilled in the art without departing from the spirit of the invention.

I claim:
1. A high voltage cable joint interconnecting the ends of two cables, each of which has at least one conductor core having the normal protecting and insulating material and electrically conductive outer coverings removed from around the ends joined, comprising a connector member each end of which is mechanically fixed to an end of one of the conductor cores of the cables to axially connect the bare conductor ends together, a preformed cylindrical elastomeric insulating housing bush enclosing said conductor ends and said connector member and being sealed at both ends to the respective outer surfaces of said cables, an electrical conductive layer covering the exterior of said cylindrical housing bush and interconnecting the electrically conductive outer coverings of the cables, an electrically conductive shield concentrically mounted within said cylindrical insulating housing bush, and means electrically connecting said electrically conductive shield to said conductor cores.

2. A high voltage cable joint as defined in claim 1, wherein the end portions of said cylindrical insulating housing bush are in gripping relation to the insulating material of said cables.

3. A high voltage cable joint as defined in claim 1, further comprising a concentrical groove formed on the inside of said cylindrical insulating housing bush and said electrically conductive shield mounted within said cylindrical insulating housing bush consists of an electrically conductive coating formed in said groove.

4. A high voltage cable joint as defined in claim 1 further comprising a concentrical groove formed on the inside of said cylindrical insulating housing bush and said electrically conductive shield is a cylindrical body mounted in said groove, at least the wall of said cylindrical body being electrically conductive.

References Cited

FOREIGN PATENTS 955,202  4/1964  Great Britain.

DARRELL L. CLAY, Primary Examiner

U.S. Cl. X.R.

29—628; 174—21, 73